United States Patent
Lu

(10) Patent No.: US 9,485,112 B2
(45) Date of Patent: Nov. 1, 2016

(54) HOME CONTROL GATEWAY AND GATEWAY CONTROL METHOD THEREOF

(71) Applicant: proeasy network solutions co., LTD., Hsinchu County (TW)

(72) Inventor: Hsing-Hung Lu, Hsinchu County (TW)

(73) Assignee: proeasy network solutions co., LTD., Hsinchu County (TW)

( * ) Notice: Subject to any disclaimer, the term of this patent is extended or adjusted under 35 U.S.C. 154(b) by 27 days.

(21) Appl. No.: 14/660,900

(22) Filed: Mar. 17, 2015

(65) Prior Publication Data

US 2016/0204954 A1    Jul. 14, 2016

(30) Foreign Application Priority Data

Jan. 14, 2015   (TW) .............................. 104101204 A

(51) Int. Cl.
*H04M 3/42* (2006.01)
*H04L 12/28* (2006.01)
*H04L 12/66* (2006.01)
*H04W 4/16* (2009.01)

(52) U.S. Cl.
CPC ........... *H04L 12/2818* (2013.01); *H04L 12/66* (2013.01); *H04M 3/42076* (2013.01); *H04W 4/16* (2013.01); *H04L 2012/2841* (2013.01)

(58) Field of Classification Search
CPC ... H04W 76/021; H04W 8/183; H04W 8/26; H04W 88/02; H04W 76/02; H04W 88/06
USPC ......... 455/410, 411, 415, 418–420; 370/252, 370/328; 700/65, 90, 275
See application file for complete search history.

(56) References Cited

U.S. PATENT DOCUMENTS

| | | | |
|---|---|---|---|
| 8,682,361 B2 | 3/2014 | Park et al. | |
| 2009/0072991 A1* | 3/2009 | Hayashi | H04L 12/282 340/11.1 |
| 2012/0172067 A1 | 7/2012 | Gillin | |
| 2016/0065383 A1* | 3/2016 | Lu | H04L 12/2834 700/275 |

FOREIGN PATENT DOCUMENTS

| | | |
|---|---|---|
| CN | 203050354 | 7/2013 |
| CN | 103442341 | 12/2013 |
| CN | 103529757 | 1/2014 |
| TW | 201304575 | 1/2013 |

\* cited by examiner

*Primary Examiner* — Sam Bhattacharya
(74) *Attorney, Agent, or Firm* — Jianq Chyun IP Office

(57) ABSTRACT

A home control gateway and a gateway control method are provided. The home control gateway includes a gateway management module, a storage module, and first and second communication circuits. The gateway management module includes a plurality of switches and a user interface for controlling the switches. The first communication circuit receives an incoming called-signal via a mobile phone network. The gateway management module opens a first switch when an incoming called-number corresponding to the incoming called-signal is identical to a pre-stored phone number in the storage module. The second communication circuit receives a connection request for accessing the user interface and instructing to open a second switch via a local area network, where the gateway management module opens the second switch in response to the connection request. The gateway management module activates a home control function corresponding to the second switch when the first and second switches are both opened.

12 Claims, 6 Drawing Sheets

HOME CONTROL GATEWAY AND GATEWAY CONTROL METHOD THEREOF

CROSS-REFERENCE TO RELATED APPLICATION

This application claims the priority benefit of Taiwan application serial no. 104101204, filed on Jan. 14, 2015. The entirety of the above-mentioned patent application is hereby incorporated by reference herein and made a part of this specification.

BACKGROUND OF THE INVENTION

1. Field of the Invention

The invention relates a home control technology, and more particularly, relates to a home control gateway and a gateway control method thereof.

2. Description of Related Art

A home automation control system generally uses of the automated equipments in combination with computer software technology and applications to integrate household equipments (e.g., televisions, electric rice cooker, air conditioners, refrigerators, gas switches, alarm systems, security systems, surveillance systems, etc.), so as to improve home comfort and home safety. The home automation control system usually includes a control system and a control host, such that users may issue control commands via the control system in order to drive various equipments through the control system. In addition, various wireless communication transmission technologies (e.g., GPRS, WiFi, WiMAX, 3G or 4G) can achieve greater flexibility and convenience by using the function of Internet connectivity in mobile equipments (e.g., mobile phones or notebook computers) to connect the Internet in order to remotely control various household equipments, enable a security mechanism, or monitor home events even if the users are in business trip, on vacation or traveling.

However, the remote control provides not only the flexibility and convenience but also security issues such as confirmation on user identity. In general, the control host assigns a control right to a user and thereby allows the user to achieve the purpose of the remote control only after the user identity is confirmed through an authentication mechanism. A common method to the above is to provide a web address by a remote home control system host, so that the user may enter a user name and a password correctly through the web address in order to obtain the control right of the remote home control system host after the authentication is passed. However, it is quite often that the user may forget the user name and the password, or the user name and the password may possibly be stolen. Therefore, it is one of the major subjects in the industry as how to provide a convenient, secure, simple and easy method for the user to conveniently and securely perform the remote control.

SUMMARY OF THE INVENTION

The invention is directed to a home control gateway and a gateway control method thereof, which are capable allowing the user to pre-store a plurality of phone numbers through the home control gateway. When a home control is to be performed by using the home control gateway, a phone call must be made to the home control gateway with the stored phone number in order to control home equipments by using switches in an operating interface provided by the home control gateway, so that the home control may be performed safely and simply.

According to an exemplary embodiment of the present invention, a home control gateway including a gateway management module, a storage module, a first communication circuit, and a second communication circuit is provided. The gateway management module is coupled to the microprocessor unit, and the gateway management module has a first switch and a second switch and provides an operating interface configured to control the second switch. The storage module is coupled to the microprocessor unit and pre-stores one or more mobile communication device numbers. The first communication circuit is coupled to the microprocessor unit, and configured to connect to a mobile phone network. The second communication circuit is coupled to the microprocessor unit, and configured to connect to a local area network. The first communication circuit receives an incoming called-signal via the mobile phone network, and the incoming called-signal includes an incoming called-number. The gateway management module opens the first switch when determining that the incoming called-number is identical to one of the mobile communication device numbers. The second communication circuit receives a connection request of a class C network uniform resource locator via the local area network, and the connection request is configured to access the operating interface and instruct to open the second switch. The gateway management module opens the second switch in response to the connection request. The gateway management module activates a home control function corresponding to the second switch when the first switch and the second switch are both opened.

In an exemplary embodiment of the invention, the home control gateway further includes a timer. The timer is coupled to the microprocessor unit. The gateway management module activates the timer when determining that the first switch is opened. When the timing value of the timer is greater than the predetermined timing threshold, the gateway management module closes the timer and the first switch.

In an exemplary embodiment of the invention, the gateway management module initially disables the second switch. The gateway management module enables the second switch when determining that the incoming called-number is identical to one of the mobile communication device numbers.

In an exemplary embodiment of the invention, the home control gateway pre-stores the mobile communication device numbers by a manual input method.

In an exemplary embodiment of the invention, the home control gateway pre-stores the mobile communication device numbers by a machine learning method.

In an exemplary embodiment of the invention, an amount of the mobile communication device numbers is less than a predefined value.

According to an exemplary embodiment of the present invention, a gateway control method executed by a home control gateway providing an operating interface is provided. The gateway control method includes pre-storing one or more mobile communication device numbers; receiving an incoming called-signal including an incoming called-number via a mobile phone network; opening a first switch when the incoming called-number is identical to one of the mobile communication device numbers. The gateway control method also includes receiving a connection request of a class C network uniform resource locator via a local area network, wherein the connection request is configured to access the operating interface and instruct to open a second switch. The gateway control method still includes opening the second switch in response to the connection request. The gateway control method further includes activating a home control function corresponding to the second switch when the first switch and the second switch are both opened.

In an exemplary embodiment of the invention, the gateway control method further includes: activating a timer when determining that the first switch is opened, and closing the timer and the first switch when a timing value of the timer is greater than a predetermined timing threshold.

In an exemplary embodiment of the invention, the gateway control method further includes: initially disabling the second switch, and enabling the second switch when determining that the incoming called-number is identical to one of the mobile communication device numbers.

In an exemplary embodiment of the invention, the gateway control method pre-stores the mobile communication device numbers by a manual input method.

In an exemplary embodiment of the invention, the gateway control method pre-stores the mobile communication device numbers by a machine learning method.

In an exemplary embodiment of the invention, an amount of the mobile communication device numbers is less than a predefined value.

Based on the above, in the home control gateway and the gateway control method according to the embodiments of the invention, the user is able to make the phone call to the home control gateway with the pre-stored phone number to request the home control gateway for accessing the operating interface and activate the switches corresponding to the home control functions through the operating interface. After determining that the user has completed aforesaid steps, the home control gateway may conduct the actions corresponding to the home control function selected by the user.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
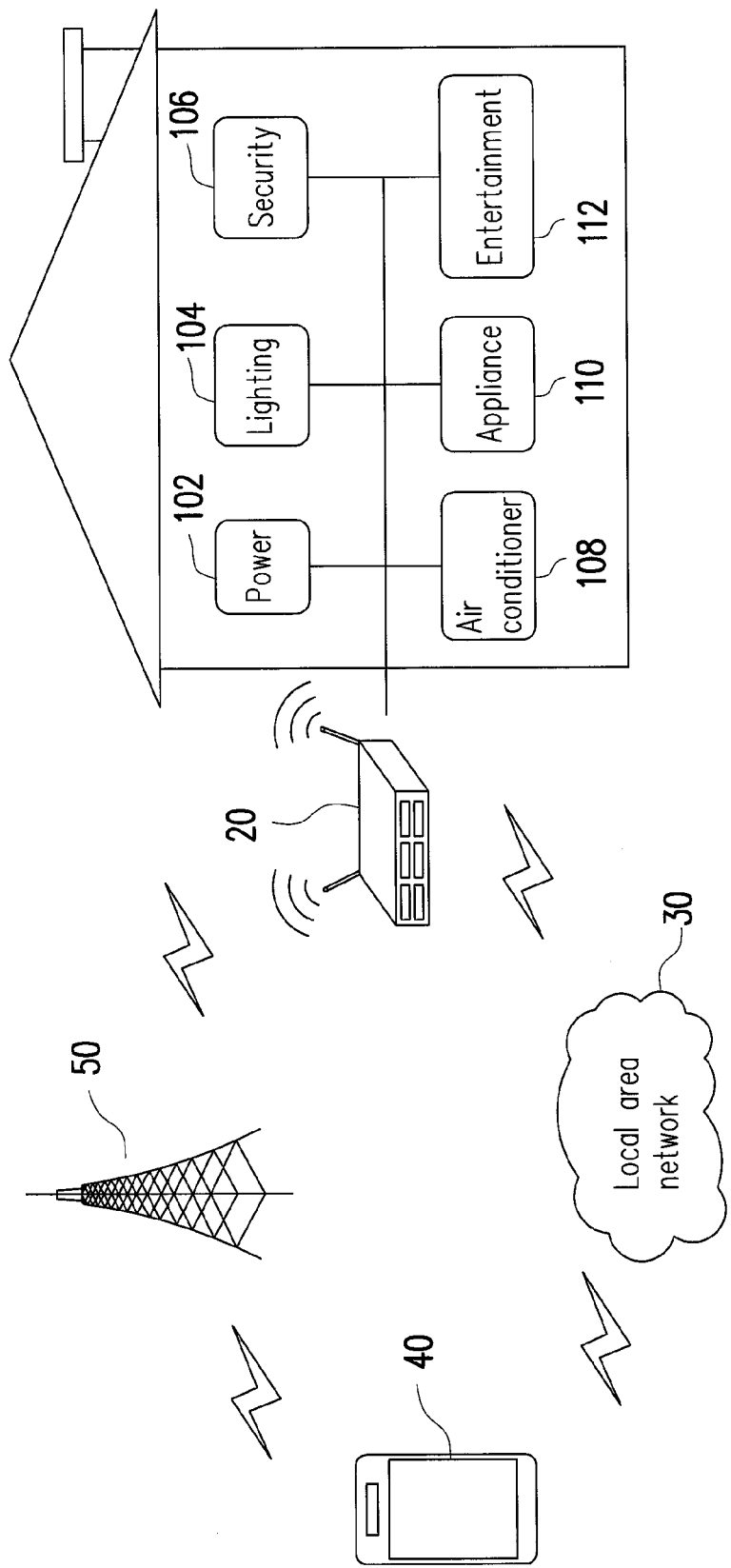
FIG. 1 is a schematic diagram illustrating a remote home control according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

With growth of the Internet technology, if steps of confirming the user identity can be further simplified and a more secure remote control method may be provided, an automation home control system may indeed be operated more conveniently and easily. The invention is developed based on the above concept.

FIG. 1 is a schematic diagram illustrating a remote home control according to an exemplary embodiment.

Referring to FIG. 1, an environment for a remote home control usually includes home equipments, a home control gateway 20, a local area network 30, a mobile communication device 40 and a mobile phone network 50.

The home equipments include a power equipment 102, a lighting equipment 104, a security equipment 106, an air condition equipment 108, an appliance equipment 110, and an entertainment equipment 112. However, it should be noted that, the home equipments are not limited to the above, and the aforesaid home equipments are not intended to limit the invention either. For example, each of the power equipment 102, the lighting equipment 104, the security equipment 106, the air condition equipment 108, the appliance equipment 110, and the entertainment equipment 112 may include a control chip or a control circuit for receiving a control command from the home control gateway 20, and executing the corresponding functional operations according to the control command.

The home control gateway 20 has a plurality of switches, where each of the switches is corresponding to a home control function of one home equipment. Further, the home control gateway 20 provides an operating interface for controlling the switches. In an exemplary embodiment of the invention, this operating interface performs a remote control to the power equipment 102, the lighting equipment 104, the security equipment 106, the air condition equipment 108, the appliance equipment 110, and the entertainment equipment 112 through a web control interface or an application (APP). In addition, the home control gateway 20 has one or more communication channels, and a user may perform the remote control through communications with the home control gateway 20 via the communication channel(s).

The local area network 30 is a wireless communication network (Wi-Fi) established according to LAN protocol transmission standard, and the home control gateway 20 may communicate with other electronic devices with network conductivity through the local area network 30. For example, this LAN protocol transmission standard is 802.11 series constituted by Institute of Electrical and Electronics Engineers (IEEE) according to the Internet protocol transmission standard. However, the invention is not limited thereto.

The mobile communication device 40 is a mobile communication equipment of the user, which includes Subscriber Identity Module Card (SIM Card). The mobile communication device 40 is, for example, a cell phone, a personal digital assistant (PDA) phone, a smart phone, and so on. However, the invention is not intended to limit types of the mobile communication device 40.

The mobile phone network 50 is a telecommunication service provided by a telecommunication service provider, such as Global System For Mobile Communications (GSM), Code Division Multiple Access (CDMA), Personal Handyphone System, (PHS) and so on.

In the present exemplary embodiment, the mobile communication device 40 is capable of communicating with the home control gateway 20 through an incoming called-signal of the mobile phone network 50 or by ways of Short Message Service (SMS) or voice message. In addition, the home control gateway 20 may also receive a connection request from the mobile communication device 40 via the local area network 30. When the connection request of the mobile communication device 40 is granted, through use of the operating interface provided by the home control gateway 20, the user may perform the remote control to the power equipment 102, the lighting equipment 104, the security equipment 106, the air condition equipment 108, the appliance equipment 110 and the entertainment equipment 112 by using the mobile communication device 40.

Figure 2:
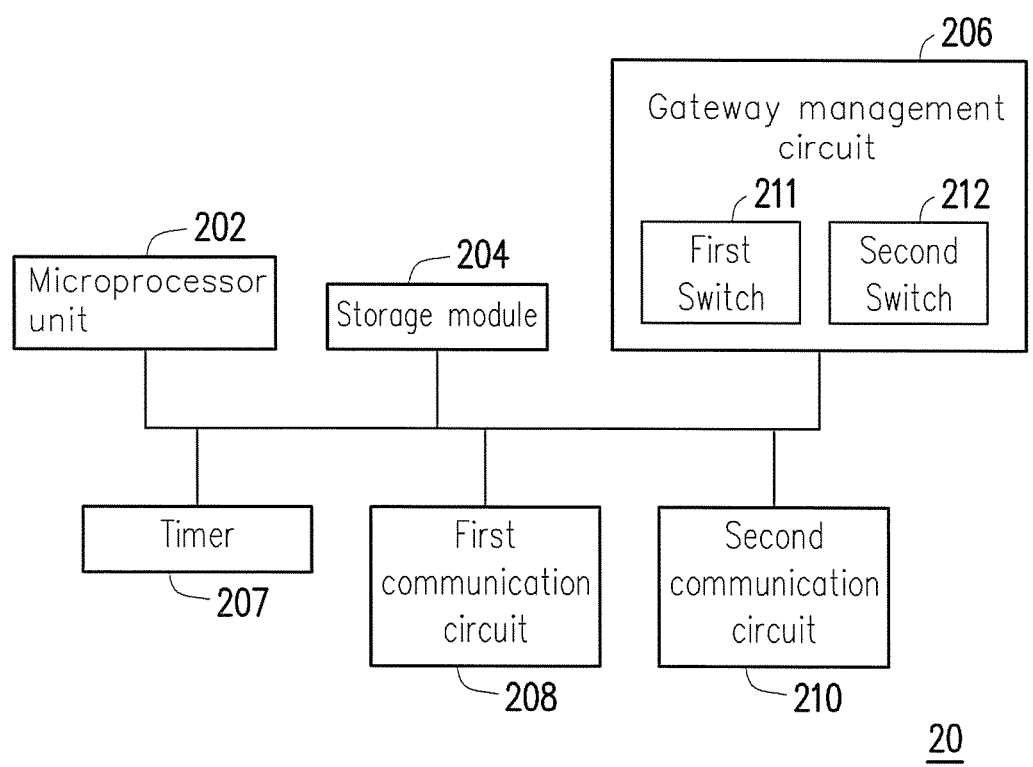
FIG. 2 is a block diagram illustrating a home control gateway according to an exemplary embodiment.

FIG. 2 is a block diagram illustrating a home control gateway according to an exemplary embodiment.

Referring to FIG. 2, the home control gateway 20 includes a microprocessor unit 202, a storage module 204, a gateway management module 206, a first communication circuit 208 and a second communication circuit 210.

The microprocessor unit 202 may be a hardware with computing capabilities (e.g., a chip set, a processor, etc.) which is configured to control overall operation of the home control gateway 20. In the present exemplary embodiment, the microprocessor unit 202 is, for example, a central processing unit (CPU) or other programmable microprocessors, a digital signal processor (DSP), a programmable controller, an application specific integrated circuits (ASIC), a programmable logic device (PLD) or other similar devices.

The storage module 204 is coupled to the microprocessor unit 202. The storage module 204 may be an embedded storage unit or an external storage unit. The embedded storage unit may be a random access memory (RAM), a read-only memory (ROM), a flash memory, a magnetic disk storage device, and so on. The external storage unit may be Compact Flash (CF) memory card, Secure Digital (SD) memory card, Micro SD memory card, Memory Stick (MS) memory card, and so on. Specifically, in the present exemplary embodiment, the storage module 204 is configured to store a phone number of the mobile communication device and store one or more programs or applications, operating systems for controlling operation of the home control gateway 20. Furthermore, in an exemplary embodiment, the storage module 204 may also be composed of a plurality of registers, and each of the register may be stored with one mobile communication device number. An amount of the mobile communication device numbers may be less than a predefined value. This predefined value is a number, such as an amount of the registers.

In addition, before the user can perform operations for the remote home control through the home control gateway 20, the mobile communication device numbers must be pre-stored into the storage module 204 of the home control gateway 20. In the present embodiment, the user is able to pre-store one or more mobile communication device numbers.

For example, the user may store his/her mobile communication device number into the storage module 204 by a machine learning method through the home control gateway 20. Alternatively, in another exemplary embodiment, the user may also store his/her mobile communication device number into the storage module 204 by a manual input method.

In the example where the phone number is stored by the machine learning method through the home control gateway 20, the user may first press a learning button disposed on the home control gateway 20, so as to activate an automatic learning function of the home control gateway 20. Thereafter, the user may make a phone call to the home control gateway 20. In this case, the home control gateway 20 may identify the phone number of such phone call according to the incoming called-signal and store the incoming called-signal into the storage module 204 of the home control gateway 20 without answering to the phone call.

In the example where the phone number is stored into the storage module 204 of the home control gateway 20 by the manual input method, the operating interface of the home control gateway 20 may include an input screen for the mobile communication device number, so that the user is able to key in the mobile communication device number through an electronic device having a physical keyboard or a virtual keyboard. As another example, the user is also able to input the phone number to be pre-stored as a short message through the mobile communication device and transmit the short message to the home control gateway 20 for storage. As yet another example, through a voice operating service provided by the home control gateway 20, the user is also able to input the phone number into the home control gateway 20 for storage by using a phone keypad.

The gateway management module 206 is coupled to the microprocessor unit 202 and has a plurality of switches. One of the switches (also known as a first switch 211) is used as a flag, which is configured to instruct a current control state of the home control gateway 20 to be an opening mode, a closed mode or other modes. For example, when the control state of the home control gateway 20 is the opening mode, it indicates that the home control gateway 20 is granted to perform the remote control to the home equipments. For example, when the control state of the home control gateway 20 is the closed mode, it indicates that the home control gateway 20 is not granted to perform the remote control to the home equipments. Herein, aspects included by the control state are not particularly limited in the invention. A preset control state of the first switch 211 is the closed mode. Further, the rest of the switches (also known as a second switch 212) are corresponding to the home control functions of the home equipments, respectively. For example, the gateway management module 206 may include one switch for corresponding to on/off states of the lighting equipment 104. For example, the gateway management module 206 may include one switch configured for corresponding to on/off states of the air condition equipment 108. For example, the gateway management module 206 may include one switch configured for corresponding to a temperature regulation function of the air condition equipment 108. For example, the gateway management module 206 may include one switch configured for corresponding to on/off states of the entertainment equipment 112. Herein, the invention is not intended to limit an amount of the switches included in the gateway management module 206 nor actions of the home control function to which the switches correspond. It is worth mentioning that, in another embodiment of the invention, the functions of the gateway management module 206 and the switches included therein are implemented in a manner of circuitry, but the invention is not limited thereto. For example, the functions of the gateway management module 206 and the switches included therein may also be implemented in a manner of program codes stored in the storage module 204. Further, when the home control gateway 20 is powered on, the microprocessor unit 202 may run the program codes in order to execute the functions of the gateway management module 206.

In addition, the gateway management module 206 also provides the operating interface, so that the user may control the second switch 212 through the operating interface to operate the corresponding home control function. The home control gateway 20 also provides a class C network uniform resource locator (URL) (i.e., a web address) for accessing the operating interface. Particularly, the home control gateway 20 grants the electronic device of the user to access the operating interface simply by using the class C network uniform resource locator without using a login mechanism with an account name and a password. That is to say, it is not required for the operating interface provided by the home control gateway 20 to include a user login screen. Accordingly, the inconvenience for memorizing the account name and the password as well as the trouble for resetting the home control gateway 20 caused by forgetting the account name and the password may both be prevented. It should be noted that, the class C network herein refers to an IP (Internet Protocol) address of the home control gateway 20 assigned by the corresponding local area network 30. For instance, the address of this class C network is "192.168.1.1". In the present exemplary embodiment, the operating interface is implemented in form of a web page, and the mobile communication device 40 uses a browser to open a service page through Wi-Fi connection with the web address provided by the home control gateway 20. In another embodiment of the invention, the operating interface may also be in form of the application (APP). Nevertheless, it should be understood that the invention is not limited thereto.

The first communication circuit 208 is coupled to the microprocessor unit 202 and operates by using a transmission standard or a protocol compatible with the mobile phone network 50. For example, the first communication circuit 208 is capable of transmitting and receiving a voice signal or the short message via the mobile phone network 50.

The second communication circuit 210 is coupled to the microprocessor unit 202 and operates by using a transmission standard or a protocol compatible with the local area network 30 in order to transfer or receive packets through the local area network 30.

FIGS. 3A to 3D are flowcharts illustrating a gateway control method according to an exemplary embodiment.

Figure 3A:
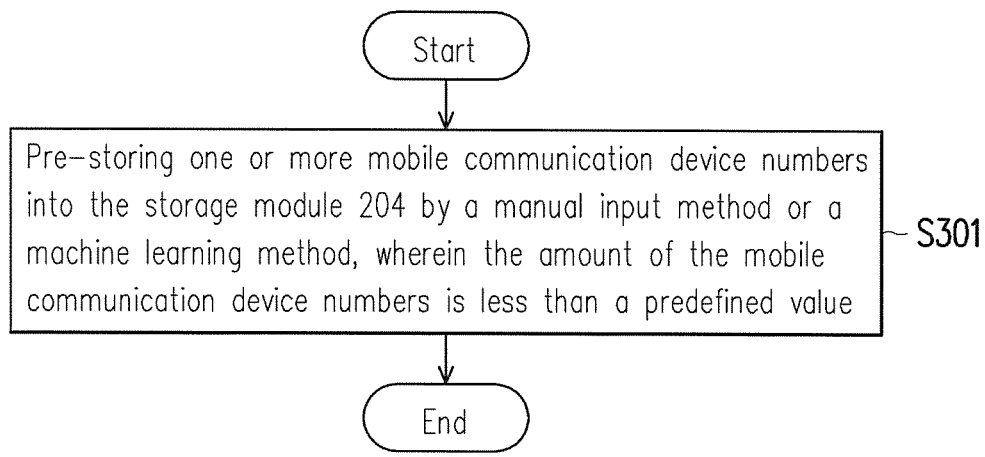
FIGS. 3A to 3D are flowcharts illustrating a gateway control method according to an exemplary embodiment.

Referring to FIG. 3A, in step S301, the user pre-stores one or more mobile communication device numbers into the storage module 204 by a manual input method or a machine learning method.

Figure 3B:
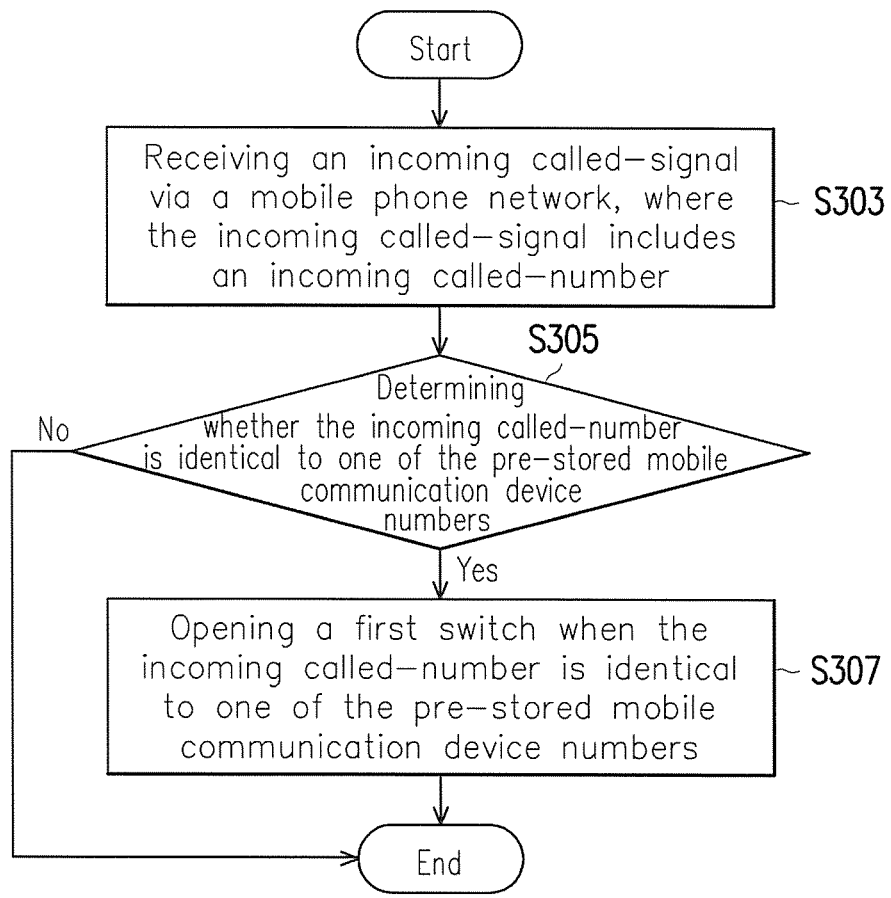

Referring to FIG. 3B, in step S303, the first communication circuit 208 receives an incoming called-signal including an incoming called-number via the mobile phone network 50. The first communication circuit 208 also identifies the incoming called-number. In particular, the first communication circuit 208 is capable of identifying the incoming called-number without answering to the incoming called-signal.

In step S305, the gateway management module 206 compares the incoming called-number with the mobile communication device numbers pre-stored in the storage module 204, and determines whether the incoming called-number is identical to one of the pre-stored mobile communication device numbers. If the gateway management module 206 determines that the incoming called-number is identical to one of the pre-stored mobile communication device numbers, in step S307, the gateway management module 206 opens the first switch 211 to instruct the current control state of the home control gateway 20 to be the opening mode and ready for accepting the remote control.

If the gateway management module 206 determines that the incoming called-number is not identical to any of the pre-stored mobile communication device numbers, the gateway management module 206 does not open the first switch 211.

Figure 3C:
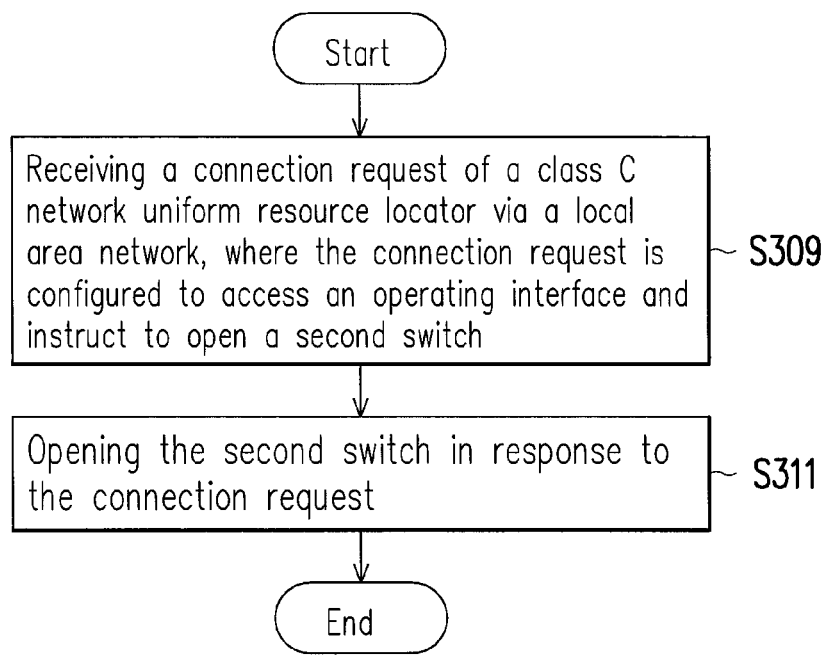

Referring to FIG. 3C, in step S309, the second communication circuit 210 receives a connection request of a class C network uniform resource locator via the local area network 30, wherein the connection request is configured to access an operating interface provided by the gateway management module 206 and instruct to open the second switch 212 through the operating interface. In step S311, the gateway management module 206 opens the second switch 212 in response to the connection request.

Figure 3D:
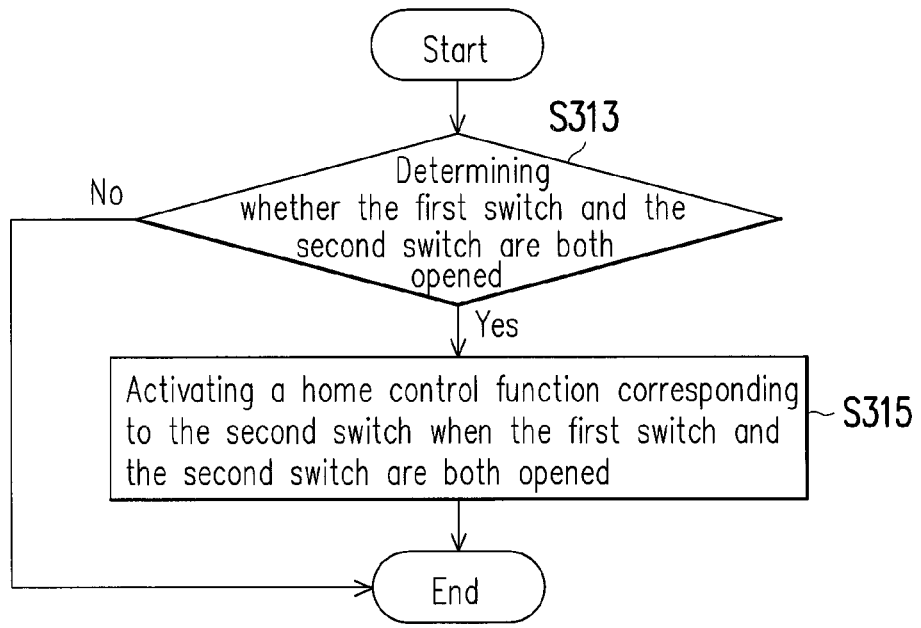

Referring to FIG. 3D, in step S313, the gateway management module 206 determines whether the first switch 211 and the second switch 212 are both opened. In step S315, the gateway management module 206 activates a home control function corresponding to the second switch 212 when the first switch 211 and the second switch 212 are both opened.

It should be noted that, it is also possible that steps S309 to S311 in FIG. 3C are performed in advance to steps S303 to S307 in FIG. 3B.

Figure 4:
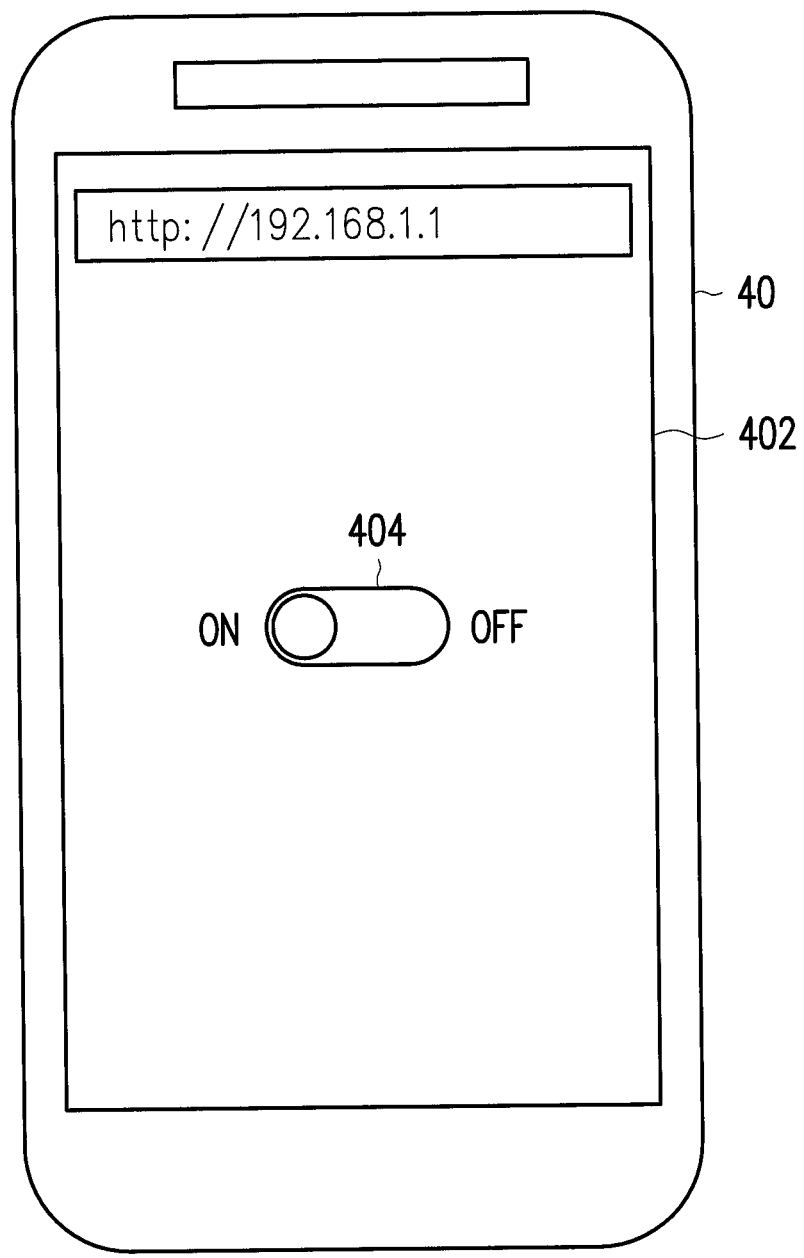
FIG. 4 is a block diagram illustrating the operating interface of the home control gateway according to an exemplary embodiment.

FIG. 4 is a block diagram illustrating the operating interface of the home control gateway according to an exemplary embodiment.

Referring to FIG. 4, herein, it is assumed that the user who arrived at a front door intends to open a door lock through the operating interface of the home control gateway 20 by using the mobile communication device 40. First of all, the user must make a phone call to the home control gateway 20 with the pre-stored phone number. Particularly, the home control gateway 20 does not answer to the phone call but only identifies whether the phone number of such phone call is identical to one of the mobile communication device numbers. When it is confirmed that the phone number of such phone call is identical to one of the pre-stored mobile communication device numbers, the home control gateway 20 opens the first switch 211 to instruct the home control gateway 20 to accept the remote control for now. Subsequently, the user may use the mobile communication device 40 to connect to a wireless local area network environment (e.g., class C domain 192.168.1.x) provided by the home control gateway 20 via the local area network 30, and input the class C network uniform resource locator (e.g., "http://192.168.1.1") provided by the home control gateway 20 into an address bar of a browser of the mobile communication device 40 in order to request the home control gateway 20 for accessing the operating interface. Subsequently, the home control gateway 20 may transmit a control web page screen 402 served as the operating interface in packets to the mobile communication device 40 via the local area network 30 and shows the control web page screen 402 on the browser of the mobile communication device 40. The user may issue an instruction for opening the door lock of the front door through a web page button 404 (i.e., the second switch 212) on the control web page screen 402 (i.e., the operating interface), and such instruction is then transmitted in packets back to the home control gateway 20. Lastly, the home control gateway 20 identifies that the first switch 211 and the second switch 212 are both opened to thereby open the front door so that the user may enter the house successfully.

It should be noted that, in another exemplary embodiment, the home control gateway 20 may include a timer 207, which is coupled to the microprocessor unit. When the first switch 211 is opened, it indicates that the home control gateway 20 is ready for accepting the remote control while the gateway management module activates the timer 207 simultaneously. Further, a timing value of the timer 207 is compared with a predetermined timing threshold. For example, the predetermined timing threshold may be freely set by the user to be, for example, 3 minutes, 5 minutes, etc. When the timing value of the timer 207 is greater than the predetermined timing threshold, the gateway management module closes the timer 207 and the first switch 211. For example, in the case where the timing value is 5 minutes, when the timing value of the timer 207 is greater than 5 minutes, the gateway management module closes the timer 207 and the first switch 211.

Specifically, the user needs to make the phone call to the home control gateway 20 with the pre-stored phone number in order to open the first switch 211, so that the home control gateway 20 may accept the remote control while activating the timer 207 at the same time. Herein, it is assumed that the user opened the second switch 212 corresponding to the function of the home equipment in the operating interface within a time defined by the predetermined timing threshold of the timer 207. In this case, because the first and second switches are both opened, the home control gateway 20 may then execute the home control function corresponding to the second switch 212. Otherwise, if the user opens the second switch 212 corresponding to the function of the home equipment in the operating interface after the time defined by the predetermined timing threshold of the timer 207 is expired, because the first switch 211 is closed in this case, the user cannot conduct the remote control to the home equipment since there is only the second switch 212 being opened. Accordingly, a security for the remote home control may be improved more preferably.

In another exemplary embodiment of the invention, the gateway management module 206 of the home control gateway 20 initially disables the second switch 212. In other words, the second switch 212 is initially set to be inoperable. Before the user uses the mobile communication device 40 to connect to the operating interface of the home control gateway 20 via the local area network 30 in order to control the home equipment, the phone call must be made to the home control gateway 20. Then, when determining that the incoming called-number is identical to one of the pre-stored mobile communication device numbers, the gateway management module 206 activates first switch 211 to instruct the home control gateway 20 to accept the remote control for now while activating the second switch 212 (setting the second switch 212 to be operable). Subsequently, the user may gain access to the operating interface of the home control gateway 20 by using the connection request of the class C network uniform resource locator via the local area network 30 in order to open the second switch 212. Lastly, when determining that the first switch 211 and the second switch 212 are both opened, the home control gateway 20 then activates the home control function corresponding to the second switch 212.

Figure 5:
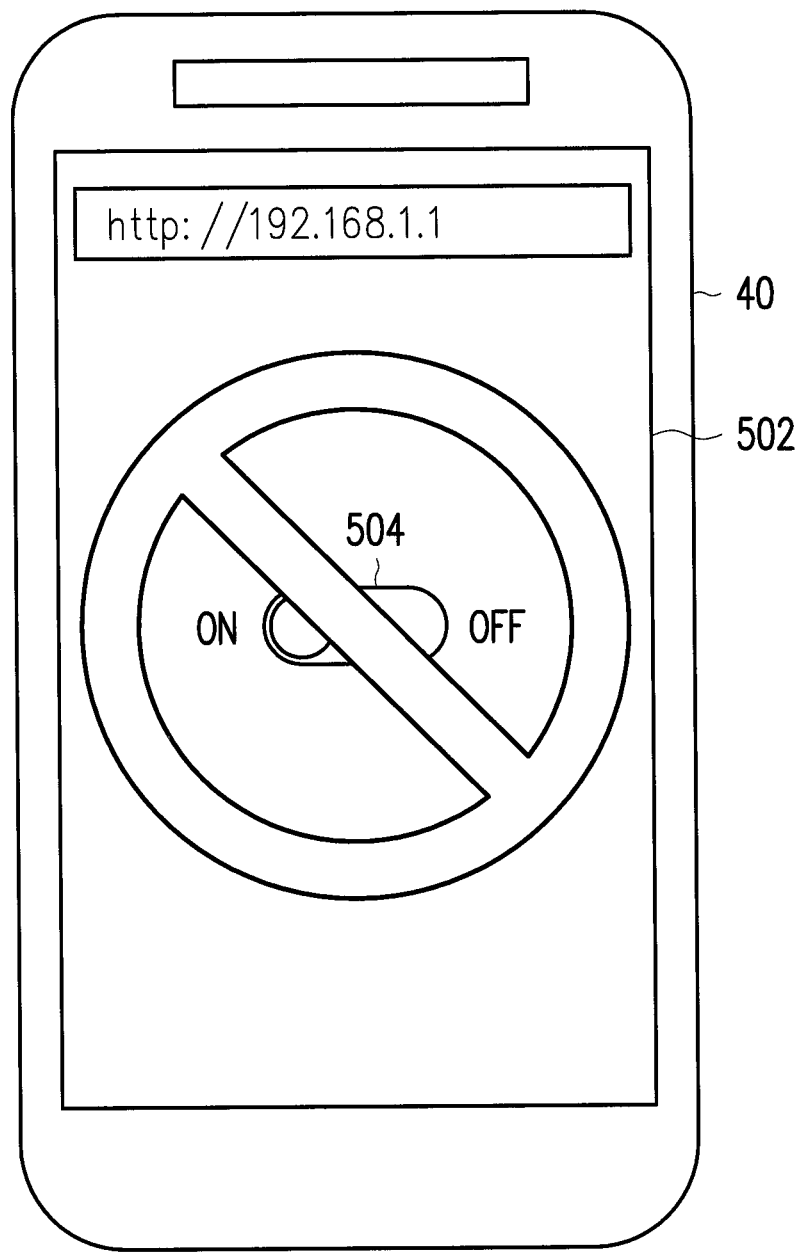
FIG. 5 is a block diagram illustrating the operating interface of the home control gateway according to another exemplary embodiment.

FIG. 5 is a block diagram illustrating the operating interface of the home control gateway according to another exemplary embodiment.

Referring to FIG. 5, it is assumed that the user does not make the phone call to the home control gateway 20 after arriving at the front door but use the mobile communication device 40 to connect to the class C network uniform resource locator (e.g., http://192.168.1.1) provided by the home control gateway 20 via the local area network 30 and request for accessing the operating interface. In this case, a web age button 504 (i.e., the second switch 212) on a control web page screen 502 (i.e., the operating interface) viewed by the user on the browser of the mobile communication device 40 is instructed to be a disable state. Accordingly, the user is able to gain access to the operating interface (the control web page screen 502) of the home control gateway 20 but unable to control any of the home equipments. As such, the user needs to make the phone call to the home control gateway 20 with the pre-stored phone number. When the gateway management module 206 of the home control gateway 20 determines that the incoming called-number is identical to one of the pre-stored mobile communication device numbers, the first switch 211 is opened to instruct the home control gateway 20 to accept the remote control while enabling to the second switch 212 to relieve the disable state for the home control function corresponding to the second switch 212. Subsequently, the user is able to gain access to the operating interface (the control web page screen 502) and set the web page button 504 (i.e., the second switch 212) open. Lastly, after the home control gateway 20 determines that the first switch 211 and the second switch 212 are both opened, the front door may then be opened so that the user may enter the house successfully. Accordingly, the security for the remote home control may be further improved.

In summary, in the home control gateway and the gateway control method according to the embodiments of the invention, the user is able to make the phone call to the home control gateway with the pre-stored phone number to request the home control gateway for accessing the operating interface through the class C network uniform resource locator and activate the switches for the home control functions through the operating interface. After determining that the user has completed aforesaid steps, the home control gateway may conduct the actions corresponding to the control function of the home equipment selected by the user. In addition, the invention is also capable of counting time after the user makes the phone call to the home control gateway with the pre-stored phone number. When the user fails to control the home equipment in the operating interface within the predetermined timing unit, the user needs to re-make the phone call for requesting control to the home equipment. Furthermore, the invention is also capable of initially disabling the switches for the home control functions. When the user fails to make the phone call to the home control gateway with the pre-stored phone number in advance, even if the user requests the home control gateway for accessing the operating interface and intends to activate the switches for the home control functions through the operating interface, the switches for the home control functions and the switches in the operating cannot be used. As a result, the user is able to operate the home equipments through the mobile communication device in convenient, secure, simple and easy manners.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A home control gateway, comprising:
a microprocessor unit;

a gateway management module coupled to the microprocessor unit and having a first switch and a second switch, wherein the gateway management module provides an operating interface to control the second switch;
a storage module coupled to the microprocessor unit, wherein the storage pre-stores one or more mobile communication device numbers;
a first communication circuit coupled to the microprocessor unit, wherein the first communication is configured to connect to a mobile phone network; and
a second communication circuit coupled to the microprocessor unit and the gateway management module, wherein the second communication circuit is configured to connect to a local area network,
wherein the first communication circuit receives an incoming called-signal via the mobile phone network, and the incoming called-signal comprises an incoming called-number,
wherein the gateway management module opens the first switch when the incoming called-number is identical to one of the mobile communication device numbers,
wherein the second communication circuit receives a connection request of a class C network uniform resource locator via the local area network, and the connection request is configured to access the operating interface and instruct to open the second switch,
wherein the gateway management module opens the second switch in response to the connection request,
wherein the gateway management module activates a home control function corresponding to the second switch when the first switch and the second switch are both opened.

2. The home control gateway according to claim 1, further comprising:
a timer coupled to the microprocessor unit,
wherein the gateway management module activates the timer when the first switch is opened,
wherein the gateway management module closes the timer and the first switch when a timing value of the timer is greater than a predetermined timing threshold.

3. The home control gateway according to claim 1,
wherein the gateway management module initially disables the second switch,
wherein the gateway management module enables the second switch when the incoming called-number is identical to one of the mobile communication device numbers.

4. The home control gateway according to claim 1, wherein the mobile communication device numbers are pre-stored by a manual input method.

5. The home control gateway according to claim 1, wherein the mobile communication device numbers are pre-stored by a machine learning method.

6. The home control gateway according to claim 1, wherein an amount of the mobile communication device numbers is less than a predefined value.

7. A gateway control method executed by a home control gateway providing an operating interface, the gateway control method comprising:
pre-storing one or more mobile communication device numbers;
receiving an incoming called-signal comprising an incoming called-number via a mobile phone network;
opening a first switch when the incoming called-number is identical to one of the mobile communication device numbers;
receiving a connection request of a class C network uniform resource locator via a local area network, wherein the connection request being configured to access the operating interface and instruct to open a second switch;
opening the second switch in response to the connection request; and
activating a home control function corresponding to the second switch when the first switch and the second switch are both opened.

8. The gateway control method according to claim 7, further comprising:
activating a timer when the first switch is opened; and
closing the timer and the first switch when a timing value of the timer is greater than a predetermined timing threshold.

9. The gateway control method according to claim 7, further comprising:
initially disabling the second switch; and
enabling the second switch when the incoming called-number is identical to one of the mobile communication device numbers.

10. The gateway control method according to claim 7, wherein the mobile communication device numbers are pre-stored by a manual input method.

11. The gateway control method according to claim 7, wherein the mobile communication device numbers are pre-stored by a machine learning method.

12. The gateway control method according to claim 7, wherein an amount of the mobile communication device numbers is less than a predefined value.

* * * * *